US008206253B2

United States Patent
Lindsay et al.

(10) Patent No.: US 8,206,253 B2
(45) Date of Patent: Jun. 26, 2012

(54) METHOD FOR CONTROLLING TWO VARIABLE DISPLACEMENT HYDROSTATIC UNITS IN AN INFINITELY VARIABLE HYDRO-MECHANICAL TRANSMISSION

(75) Inventors: Ryan P. Lindsay, Moline, IL (US); Trent L. Goodnight, Hudson, IA (US); Craig A. Puetz, Waterloo, IA (US); Chad W. Seuser, Buckingham, IA (US)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 12/527,339

(22) PCT Filed: Feb. 15, 2008

(86) PCT No.: PCT/US2008/002060
§ 371 (c)(1),
(2), (4) Date: Nov. 11, 2009

(87) PCT Pub. No.: WO2008/103298
PCT Pub. Date: Aug. 28, 2008

(65) Prior Publication Data
US 2010/0062889 A1 Mar. 11, 2010

(51) Int. Cl.
*F16H 47/04* (2006.01)
(52) U.S. Cl. .............................................. 475/73; 475/80
(58) Field of Classification Search .................... 475/73, 475/80
See application file for complete search history.

(56) References Cited

U.S. PATENT DOCUMENTS
6,761,658 B1 * 7/2004 Stettler, Jr. ...................... 475/73

FOREIGN PATENT DOCUMENTS
WO 2008103298 8/2008

OTHER PUBLICATIONS
European Search Report. Nov. 14, 2011, 3 pages.

* cited by examiner

*Primary Examiner* — David D Le
*Assistant Examiner* — Derek D Knight (57) ABSTRACT

A method is provided for adjusting the displacement angles of two hydrostatic units in an infinitely variable hydro-mechanical transmission.

3 Claims, 7 Drawing Sheets

METHOD FOR CONTROLLING TWO VARIABLE DISPLACEMENT HYDROSTATIC UNITS IN AN INFINITELY VARIABLE HYDRO-MECHANICAL TRANSMISSION

FIELD OF THE INVENTION

The present invention relates to vehicle transmissions as are used in agricultural or industrial vehicles. More, particularly the present invention relates to infinitely variable hydro-mechanical transmissions having both mechanical and hydrostatic power branches. Specifically, the present invention relates to a method for controlling two variable displacement hydrostatic units.

BACKGROUND OF THE INVENTION

As shown in U.S. Pat. No. 6,761,658 infinitely variable transmissions (IVT) are known in the art to utilize a hydro-mechanical transmission with a two row planetary gear set that gives four forward travel modes, and a reversing planetary that gives reverse travel. Four torque-coupling devices are used. The first can be in a neutral position, position "C1," or position "C2." It must be in C1 or C2 when torque is desired. In addition, one of the remaining torque-coupling devices must be engaged for final torque delivery to occur (one would connect the carrier to the output shaft, one would connect the sun gear in row 2 to the output shaft, and one would be used to enable the reversing planetary which connects the reverse carrier speed to the output shaft). Two hydrostatic units are used in a closed hydraulic loop, both of which are variable displacement. The first hydrostatic unit, "CU," is connected to the torque path via C1 (hydrostatic unit coupled to carrier) or C2 (hydrostatic unit coupled to the sun gear in row 2), depending on the position of the synchronizer. The second hydrostatic unit, "RU," is permanently connected to the ring gear of the planetary gear set. The hydrostatic unit's respective displacements per revolution vary with the angle between their swashplate and piston block, with zero degrees being zero displacement. Positive and negative angles are possible with both hydrostatic units, to give a broad speed range. Their angle is controlled by a servo system and two electro-hydraulic proportional valves. The hydrostatic units can act as pumps or motors, depending on the transmission mode. The planetary gear set sums torque provided directly from the engine with that provided by the hydrostatic units (indirect engine torque). The result is a high-efficiency infinitely variable ratio transmission with a speed range and torque capability suited to agricultural and industrial applications. The transmission speed can be measured with a speed sensor on the ring gear as disclosed in U.S. Pat. No. 6,485,387. A speed sensor is also used on CU, in order to compare with the transmission speed to ensure the first torque-coupling device is properly engaged.

The transmission of U.S. Pat. No. 6,761,658 uses a synchronizer to couple the CU hydro to C1 or C2. It is spring-biased to the neutral position, and pressure is applied to one side or the other to cause engagement. Also, for the synchronizer to engage properly there must be a relatively low torque, which for the most part means there is a small speed difference between the CU hydrostatic unit and the gear to be engaged (C1 or C2). The function of the synchronizer could also be implemented with a dog-clutch, a series of clutches, or similar means, but in any case it would be desirable to have minimal speed difference for engagement.

C1 is engaged at startup so that torque delivery can be achieved with CU coupled to the carrier, after gear is commanded. Before an output speed is desired, the transmission should be fully engaged with a wheel speed of zero. This is accomplished by allowing the CU hydrostatic unit to stay at its at-rest position, which gives a high displacement, and positioning the RU hydrostatic unit to be at zero degrees, which allows any RU/ring speed but prevents CU (and therefore C1, the carrier, and the output shaft once it is coupled to the carrier) from turning.

The current technology that positions RU at zero degrees and prepares the transmission to transmit torque to the wheels uses a sensor that reports the RU hydrostatic unit angle. Closed-loop control is used to swing the RU hydrostatic unit angle until it reaches zero (input is the hydrostatic unit angle from the sensor, output is electrical current to the valve that controls RU's position). In addition, when the RU angle is known, it can be used to position the hydro precisely during shifts, check for overspeed conditions (dependent on angle), etc. However, an angle sensor adds significant cost to the transmission and decreases overall reliability.

SUMMARY OF THE INVENTION

The present invention eliminates the need for the RU angle sensor on hydro-mechanical transmissions like that disclosed in U.S. Pat. No. 6,761,658. This is done by using existing signals that are available from the transmission and new control algorithms. Described below is a unique method that allows the system to indirectly determine, and control, the actual angle of at least one hydrostatic unit.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
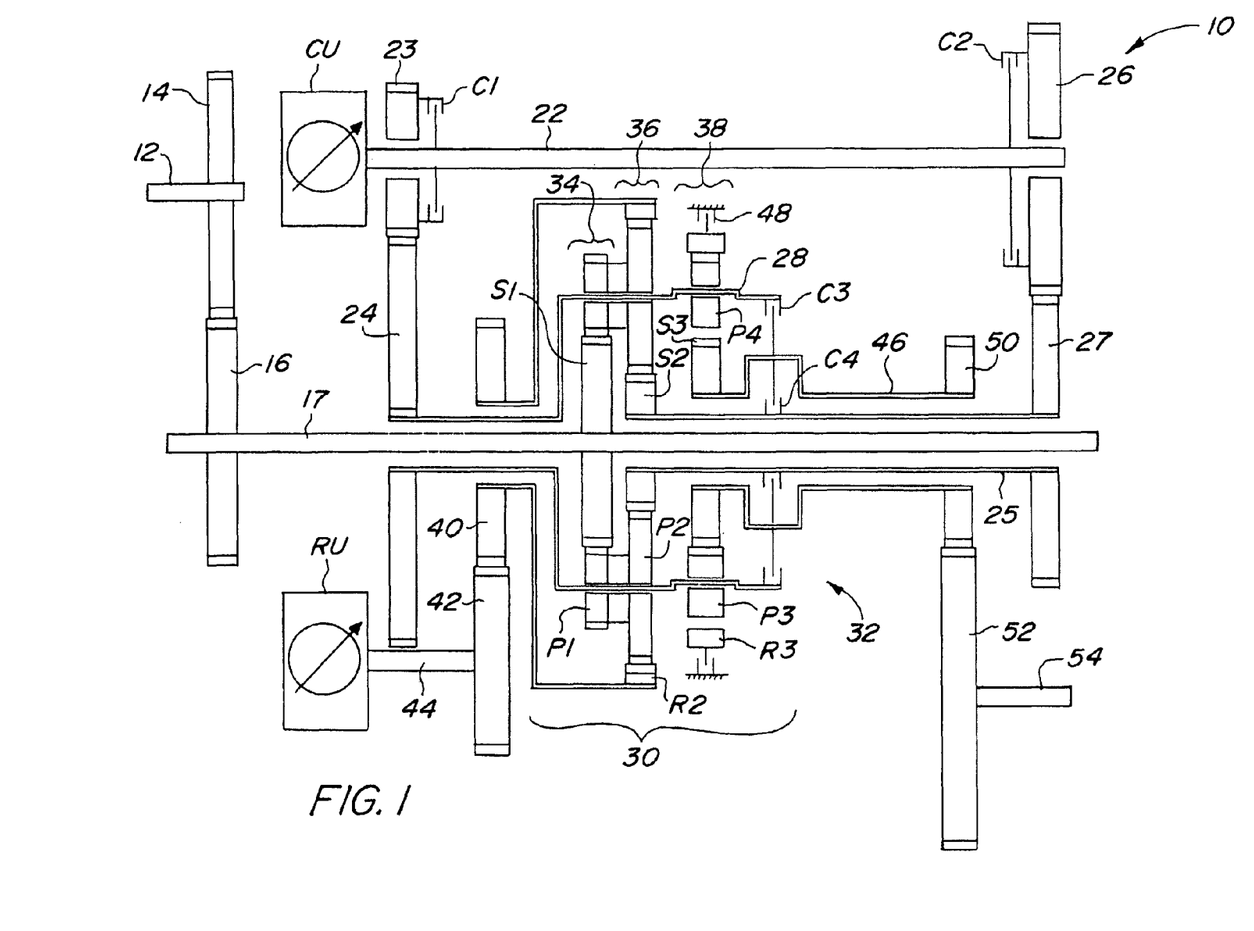
FIG. 1 is a schematic representation of an exemplary hydro-mechanical transmission employing the method of the present invention.

An exemplary embodiment of a hydro-mechanical transmission employing the method of the present invention is shown schematically in FIG. 1 and designated generally by the numeral 10. The transmission 10 has an input shaft 12 adapted to be coupled to and driven by an engine (not shown) or other source of rotational power. The transmission has a pair of hydrostatic units 18 and RU. The units are coupled hydraulically by lines (not shown) to form a hydrostatic transmission. Both the units CU and RU are variable displacement components.

The transmission 10 includes a combining mechanical transmission 30 having planetary system 32. The planetary system 32 includes three planetary gear sets 34, 36, and 38. The planetary gear sets have a common planet gear carrier 28 that carries the integral planet gears P1 and P2 of planetary gear sets 34 and 36 respectively. The carrier 28 also carries the planet gears P3 and P4 of the reversing planetary gear set 38. The planet gears P1 and P2 are integrally formed and thus rotate together. The planet gears P2 mesh with a ring gear R2. The ring gear R2 is formed integrally with a gear 40. The gear 40 is driven by the drive gear 42 on a hydrostatic unit output shaft 44. Thus the ring gear R2 serves as a hydrostatic power input element.

The transmission input shaft 12 also drives a sun gear S1 of the first planetary gear set 34 by way of gears 14 and 16 and shaft 17 whereby the sun gear S1 is the mechanical power input element. Sun gear S1 meshes with the planet gear P1. The planetary gear set 36 includes a sun gear S2 meshing with the planet gears P2.

Clutches, C3 and C4, selectively couple elements of the planetary system to the mechanical transmission output shaft 46. The clutch C3 is engagable to couple the carrier 28 to the output shaft 46 for a low speed forward range. The clutch C4 is engagable to couple the sun gear S2 to the output shaft 46 for a high speed forward range.

The output 22 of hydrostatic unit CU is selectively coupled to the planet carrier 28 by way of clutch C1 and gears 23 and 24. Output 22 is also selectively coupled to a shaft 25 and sun gear S2 by way of clutch C2 and gears 26 and 27.

The output shaft 46 is fixed to the sun gear S3. Ring gear R3 is selectively grounded by the reverse brake 48. This stops the rotation of the ring gear R3 and causes the sun gear S3 to rotate in the reverse direction for a reverse speed range. When the reverse brake 48 is applied and both clutches C3 and C4 are disengaged, the sun gear S3 drives the output shaft 46.

The output shaft 46 of the mechanical transmission is integrally formed with a gear 50 that in turn meshes with a gear 52 on the offset shaft 54. The offset shaft is coupled to the differential drive shaft (not shown) of the tractor to couple the hydro-mechanical transmission 10 to a load.

Figure 2:
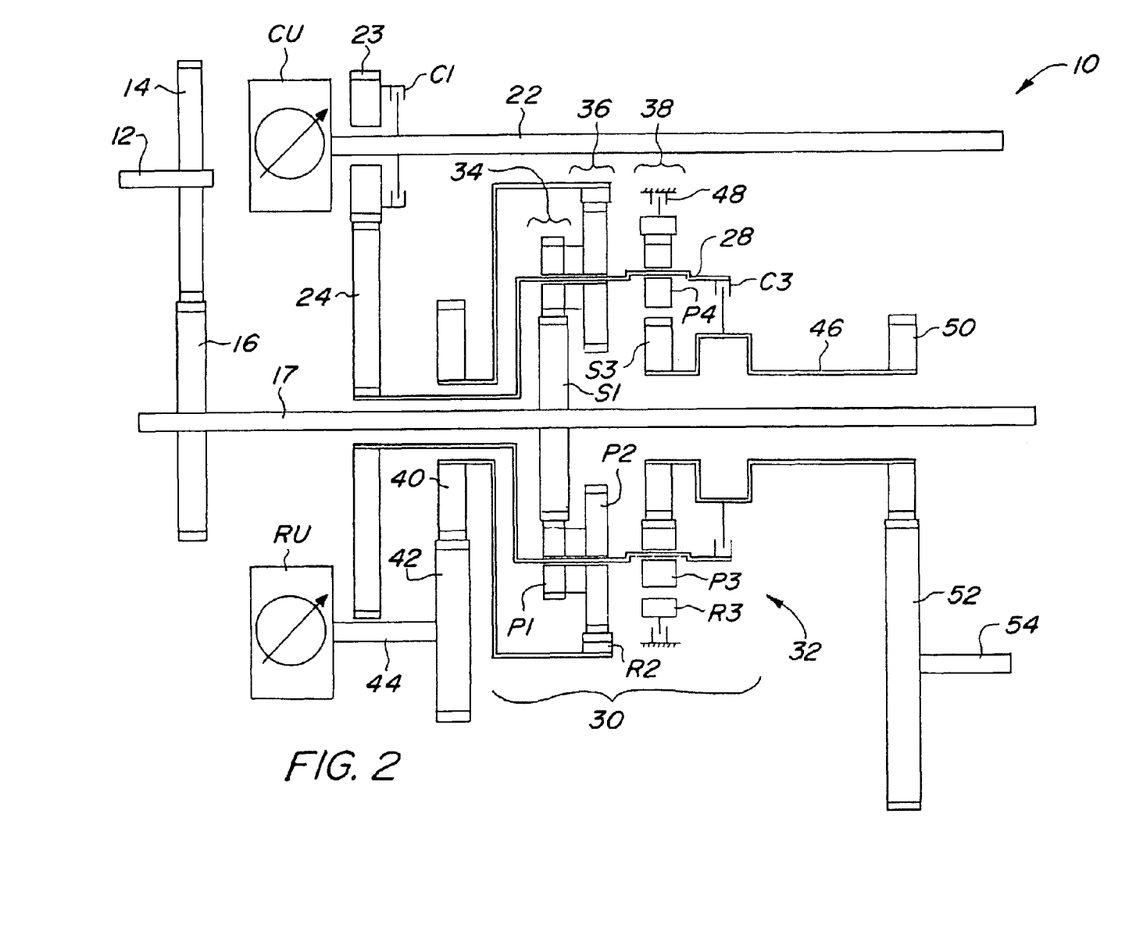
FIG. 2 is a schematic representation of the hydro-mechanical transmission of FIG. 1 operating in Mode One.

The transmission 10 operates in four modes. Each mode uses a separate path through the mechanical transmission 30 to the output shaft 46 resulting in unique gear ratios for each range Mode One Operation In Mode One clutches C1 and C3 are engaged as shown in FIG. 2. At zero output speed the hydrostatic unit CU is at maximum displacement and because it is connected to the output by way of clutches C1 and C3, its speed is zero. At zero output speed the hydrostatic unit RU is at a relatively high speed. In order for the transmission output to rotate, the displacement of hydrostatic unit RU is increased causing it to pump fluid to hydrostatic unit CU, thereby causing hydrostatic unit CU and the transmission output to rotate. When hydrostatic unit RU reaches its maximum displacement it remains at maximum displacement, while the displacement of hydrostatic unit CU is decreased. When the displacement of hydrostatic unit CU reaches zero, it blocks the flow of fluid to and from hydrostatic unit RU thus stopping rotation of hydrostatic unit RU and ring gear R2. With hydrostatic unit RU at zero speed and hydrostatic unit CU at zero displacement, the hydrostatic power is zero and all power is transmitted mechanically. At this point to shift to Mode Two clutch C1 is disengaged and clutch C2 is engaged. Since hydrostatic unit CU is at zero displacement, the nominal torque is zero. The gearing to clutches C1 and C3 is chosen such that there is no relative speed of the clutch elements of the clutch C2 at the Mode One to Mode Two shift. Because of the synchronous and zero torque condition, clutches C1 and C2 can be either clutches with conventional friction discs or collar or dog shifters of the type more commonly used in manually shifted transmissions. Reverse is obtained in Mode One by engaging the reverse brake 48 and disengaging the clutch C3 allowing the sun gear 53 and thus the transmission output to be driven in reverse.

Mode Two Operation

Figure 3:
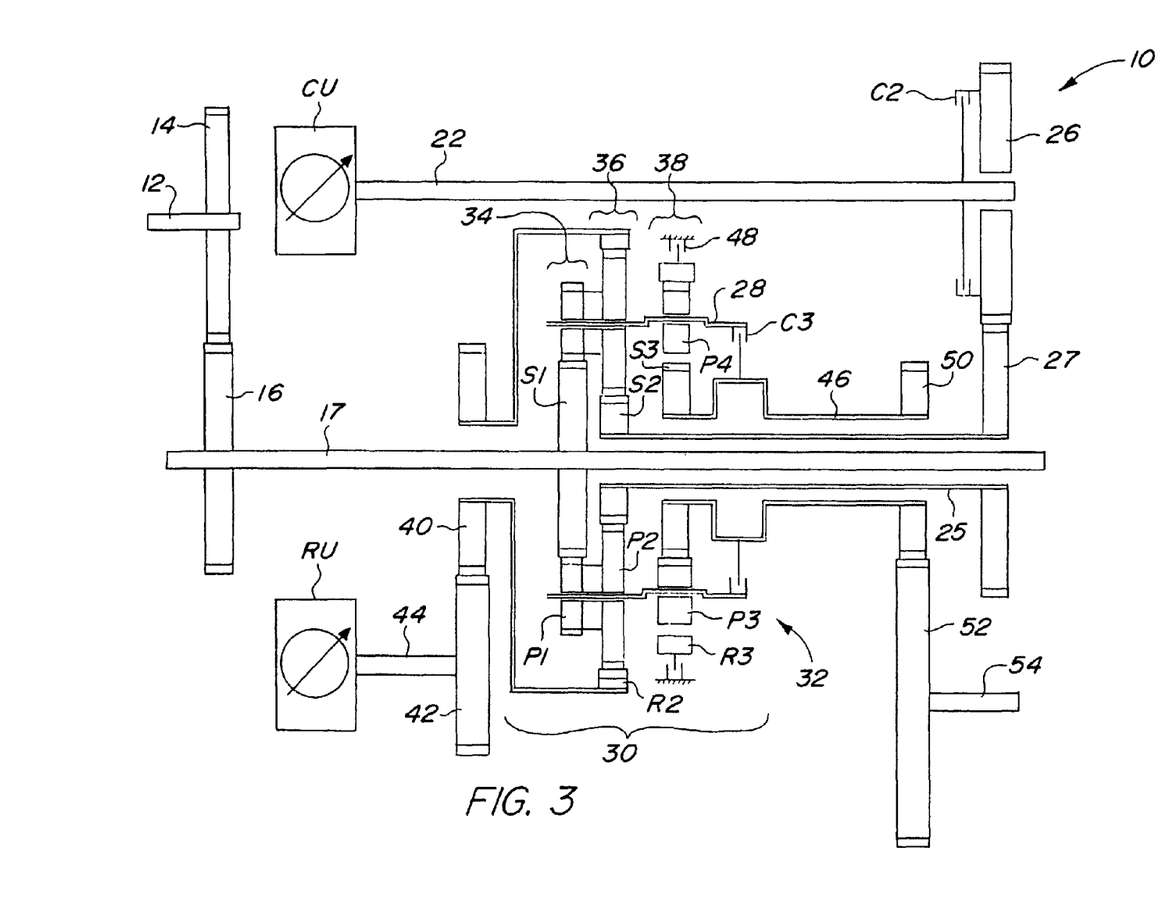
FIG. 3 is a schematic representation of the hydro-mechanical transmission of FIG. 1 operating in Mode Two.

As shown in FIG. 3 clutches C2 and C3 are engaged. At minimum output speed in Mode Two hydrostatic unit CU is at zero displacement and high speed, while the displacement of hydrostatic unit RU is at maximum and zero speed. In order to increase output speed the displacement of hydrostatic unit CU is increased, but in a direction opposite of the direction used in Mode One. This causes the speed of hydrostatic unit CU to decrease and the speed of hydrostatic unit RU to increase. After the displacement of hydrostatic unit CU reaches maximum it is held at maximum while the displacement of hydrostatic unit RU is decreased. In this mode the displacement of hydrostatic unit RU is decreased until the speed of the ring gear R2 is the same as the sun gear S1. In general the displacement of hydrostatic unit RU will be approximately 60-65% of the displacement of hydrostatic unit CU at the Mode Two to Mode Three shift, but this value depends on the specific gear ratios chosen. At this point clutch C4 can be engaged and clutch C3 disengaged. Since the torque splitting planetary has all of its elements rotating at the same speed the Mode Two to Mode Three shift will also be synchronous inasmuch as the C4 clutch has all of its elements rotating at the same speed. These clutches will however be transmitting torque so C4 must be engaged before C3 is disengaged, otherwise power flow would be interrupted. To obtain reverse in Mode Two the reverse brake 48 is engaged and clutch C3 is disengaged allowing the sun gear 53 and thus the transmission output to be driven in reverse.

Mode Three Operation

Figure 4:
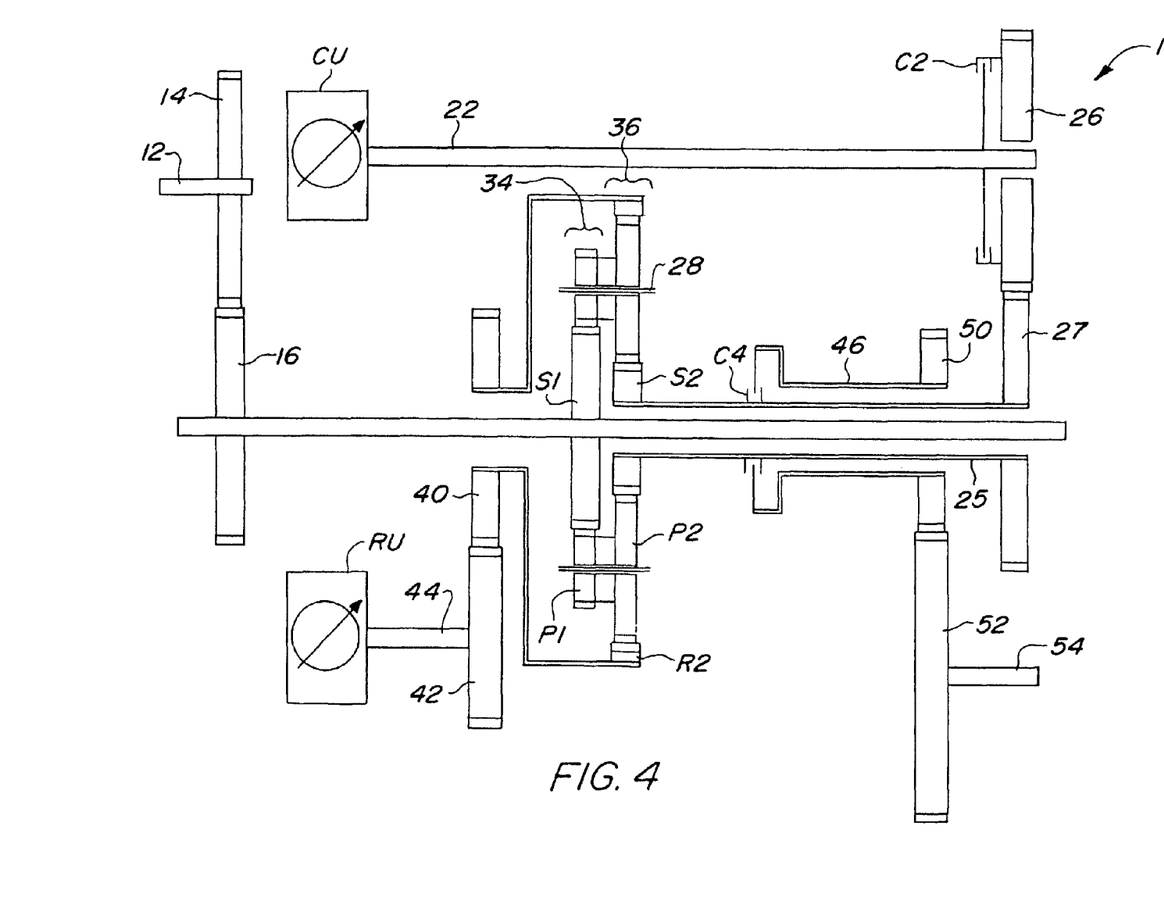
FIG. 4 is a schematic representation of the hydro-mechanical transmission of FIG. 1 operating in Mode Three.

Referring now to FIG. 4 it will be seen that clutches C2 and C4 are engaged. At minimum output in Mode Three the displacement and speed of both hydrostatic units CU and RU will be the same as at maximum output speed in Mode Two. To increase the output speed in Mode Three, the displacement of hydrostatic unit RU is increased to maximum. Then while hydrostatic unit RU is held at maximum displacement, the displacement of hydrostatic unit CU is decreased to zero, further increasing the output speed. At this point hydrostatic unit CU, being at zero displacement, blocks fluid flow to and from hydrostatic unit RU thereby stopping the rotation of hydrostatic unit RU. In order to shift from Mode Three to Mode Four clutch C2 is disengaged and clutch C1 is engaged. The torque and speeds of these clutches are the same as at the Mode One to Mode Two shift. Also all power is transmitted mechanically as at the Mode One to Mode Two shift. Reverse is not available in Mode Three.

Mode Four Operation

Figure 5:
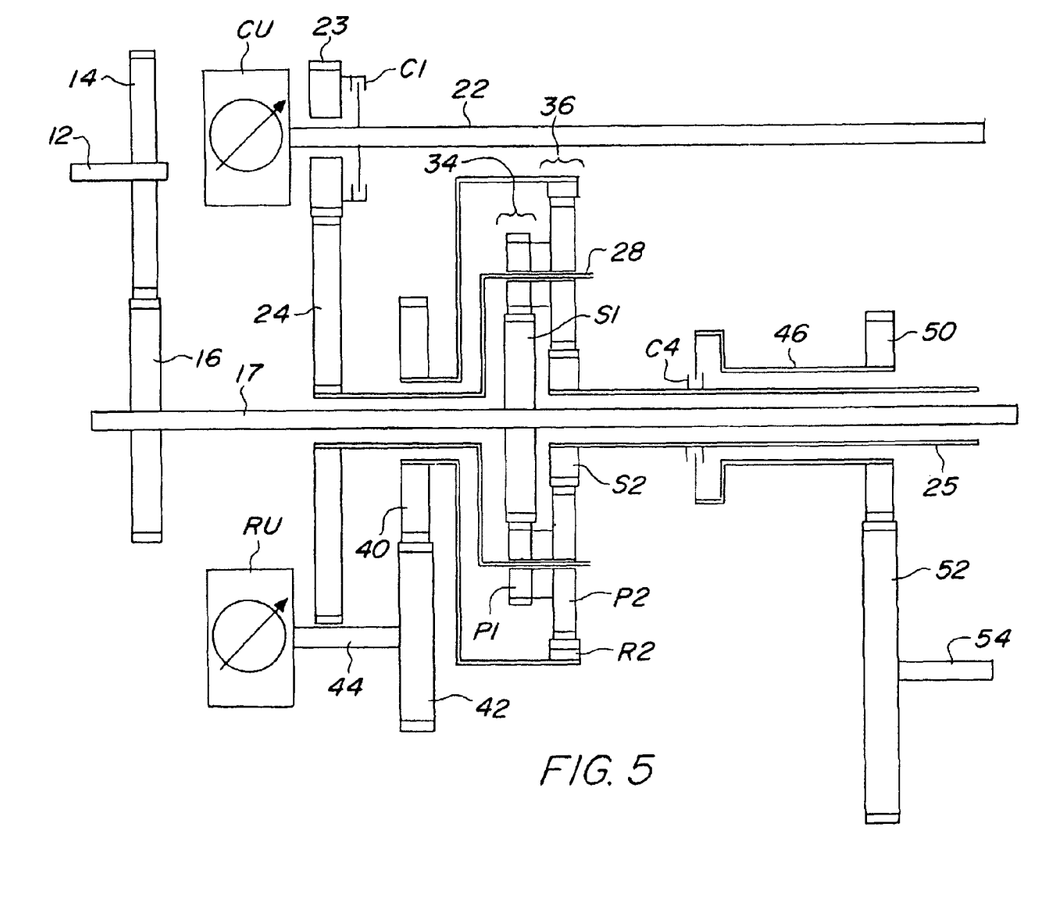
FIG. 5 is a schematic representation of the hydro-mechanical transmission of FIG. 1 operating in Mode Four.

With reference now to FIG. 5 it will be seen that clutches C1 and C4 are engaged. At minimum output speed in Mode Four the displacement and speed of both hydrostatic units CU and RU are the same as at maximum output speed in Mode Three. To increase output speed in Mode Four the displacement of hydrostatic unit CU is increased to maximum, but in the opposite direction to that of Modes Two and Three. While hydrostatic unit CU is held at maximum displacement, the displacement of hydrostatic unit RU is reduced to zero. At this point the speed of hydrostatic unit CU is zero, hydrostatic power is zero and all power is transmitted mechanically. Reverse is not available in Mode Four.

The transmission uses a synchronizer to couple the CU hydro to C1 or C2. It is spring-biased to the neutral position, and pressure is applied to one side or the other to cause engagement. Also, for the synchronizer to engage properly there must be a relatively low torque, which for the most part means there is a small speed difference between the CU hydrostatic unit and the gear to be engaged (C1 or C2). Those having skill in the art will recognize that the function of the synchronizer could also be implemented with a dog-dutch, a series of clutches, or similar means, but in any case it would be desirable to have minimal speed difference for engagement.

C1 is engaged at startup so that torque delivery can be achieved with CU coupled to the carrier, after gear is commanded. Before an output speed is desired, the transmission should be fully engaged with a wheel speed of zero. This is accomplished by allowing the CU hydrostatic unit to stay at its at-rest position, which gives a high displacement, and positioning the RU hydrostatic unit to be at zero degrees, which allows any RU/ring speed but prevents CU (and therefore C1, the carrier, and the output shaft once it is coupled to the carrier) from turning.

It is necessary to position RU at zero degrees and prepare the transmission to transmit torque to the wheels. Closed-loop control is used to swing the RU hydrostatic unit angle until it reaches zero (input is the hydrostatic unit angle from the sensor, output is electrical current to the valve that controls RU's position). In addition, when the RU angle is known, it can be used to position the hydro precisely during shifts, check for overspeed conditions (dependent on angle), etc. Thus the software needs an indication of the RU angle before the synchronizer is engaged. This is accomplished in the following manner: first, CU is kept at a known, high displacement position. Assuming RU is being turned at a reasonable speed, it will act as a hydraulic pump and CU, which is not yet coupled with C1 or C2 and is free to spin, will act as a hydraulic motor. Therefore, if RU has any nonzero angle it will displace fluid and CU will turn at some speed; if RU is at zero angle it will not displace any fluid and CU will have zero speed. But if the ring speed—or engine speed—changes, the CU speed will change as well and the control system will misinterpret this as the RU angle changing. One solution is to force RU and the engine to be at specific, stable speeds before attempting to control RU's position. However, this greatly increases the time required before gear can be commanded, which leads to operator dissatisfaction. Preferably, ring speed is normalized to engine speed to eliminate the effects of engine speed changes, then the CU speed is normalized to this ring speed to eliminate the effects of ring speed changes. This normalized CU speed is now a direct indicator of RU's angle and closed-loop control of RU's position can be performed.

In order to keep costs low and reliability high, the CU speed sensor measures only absolute speed, not direction. If there is a lag in the hydro response, the control system may cause RU to overshoot zero degrees, and without knowing if the angle, and therefore speed, is positive or negative the controls will not be able to correct this. To resolve this concern, the sign of the CU speed is determined. Before the engine is started and there is no hydraulic pressure, RU will rest against its negative stop. Once the ring spins fast enough for CU to spin, the first CU speed seen will be negative (its initial value is known). The CU speed sign is latched in to what the previous value was, unless the CU speed is steadily moving away from zero. In this case, the sign must be wrong since the control system is targeting zero degrees, so the sign is flipped.

The CU speed sensor may not be able to reliably measure low speed. And if the system attempts to engage the synchronizer with the speed not truly at zero, the synchronizer may not fully engage until an actual speed of zero occurs. To guarantee proper engagement after the system has attempted to engage C1, RU will be ramped in a negative direction until an appropriate CU speed is seen (to verify that the CU speed is in fact negative). After that, the RU is ramped up until a positive speed is seen. This does two things. First, since the CU speed goes from negative to positive, the system knows the synchronizer has been through zero torque (CU speed of zero, corresponding to RU angle of zero). Second, taking the CU to a sufficient positive speed will allow a comparison to be done on speeds on both sides of the synchronizer (transmission speed vs. CU speed) to make sure it is fully engaged before putting the tractor in gear.

When the transmission is cold, the viscosity of the oil can be very high. This makes the torque transmitted from RU to CU, with the RU not at a perfect zero displacement, much higher. With this high torque there is a higher probability that the synchronizer will not successfully engage until the ramp-down/ramp-up. In addition, the hydrostatic unit response will be very slow due to the high viscosity of the oil in the control circuit. These facts present a special problem: the synchronizer is more likely to not be engaged while ramping down, and the effect of ramping down will be greater due to the hydrostatic unit lag—that is, the speed will overshoot by a greater amount, resulting in a larger speed mismatch across the synchronizer which could lead to long-term damage. To address this problem, a very aggressive ramp up can be used to improve the hydrostatic unit's response. (With warm oil this may be undesirable due to perceptible jerks.)

Figure 6:
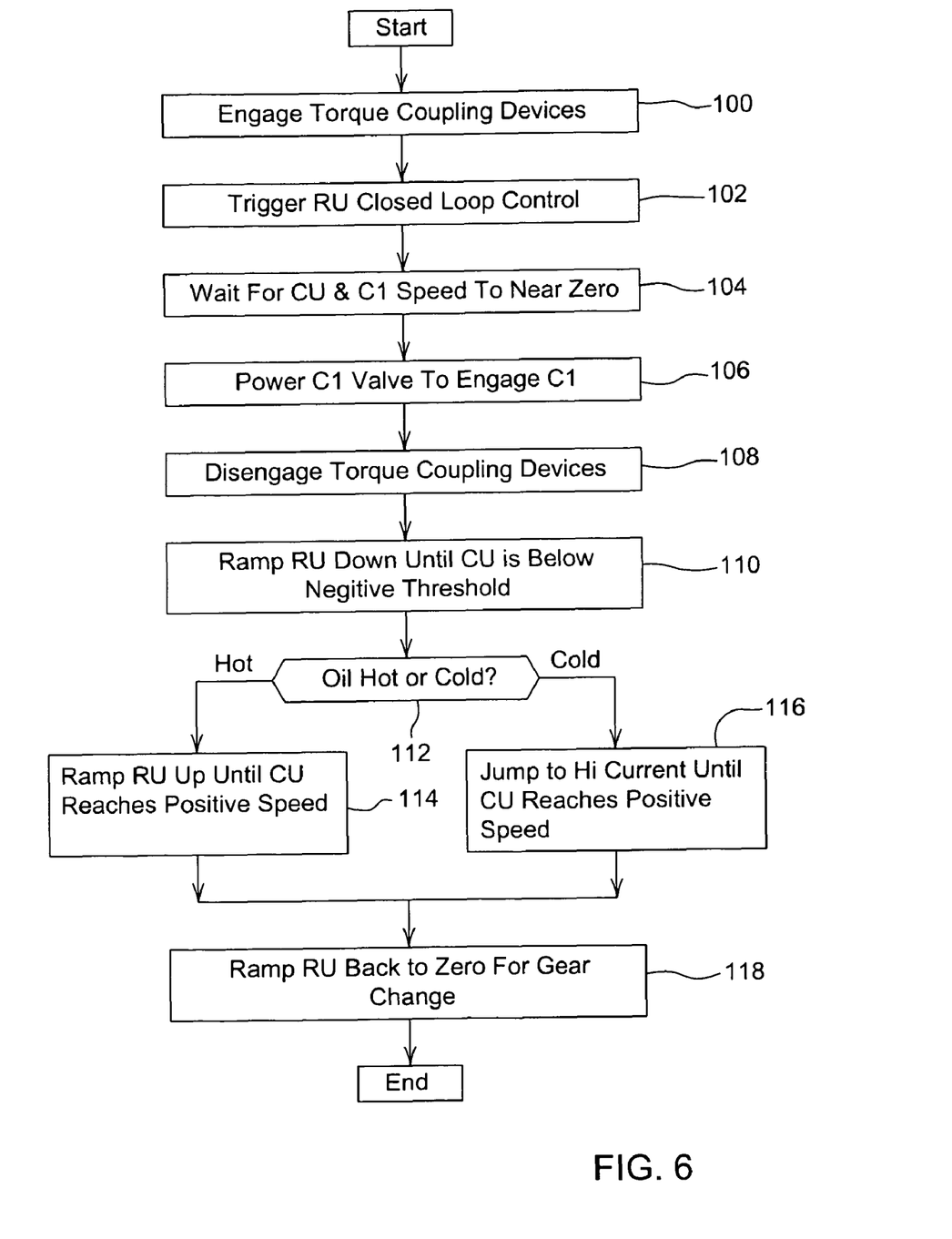
FIG. 6 is a flow chart illustrating the steps of the method of the present invention; and, FIG. 7 is a block diagram illustrating the scheme for controlling the displacement angles of the hydrostatic units according to the invention.

The method of the present invention engaging the synchronizer at startup are illustrated in the flow chart of FIG. 6. At 100 one or more torque-coupling devices are engaged to stop the carrier. This will force the C1 speed to zero and cause the ring speed (and therefore RU speed) to increase. As soon as the ring speed is fast enough, the RU closed-loop control is triggered at 102 with a target of zero degrees (CU speed of zero).

At 104 wait for the CU speed and C1 speed to be near zero, and then power the C1 valve to engage C1 at 106.

At 108 disengage the torque-coupling device(s) used earlier to stop the carrier, and stop the closed-loop control.

At 110 ramp RU down until the CU speed is below a negative threshold. This ensures RU is on the negative side.

At 112 determine if oil is warm or cold. If warm oil, ramp RU up until CU reaches a sufficient positive speed at 114. If cold oil, jump immediately to a high current until CU reaches a sufficient positive speed at 116. The current value used should be greater than the value known to give the desired speed. This will improve hydro response without causing tractor jerks, since the hydro moves slowly with cold oil.

Finally at 118, ramp RU back to zero so gear can be engaged.

Figure 7:
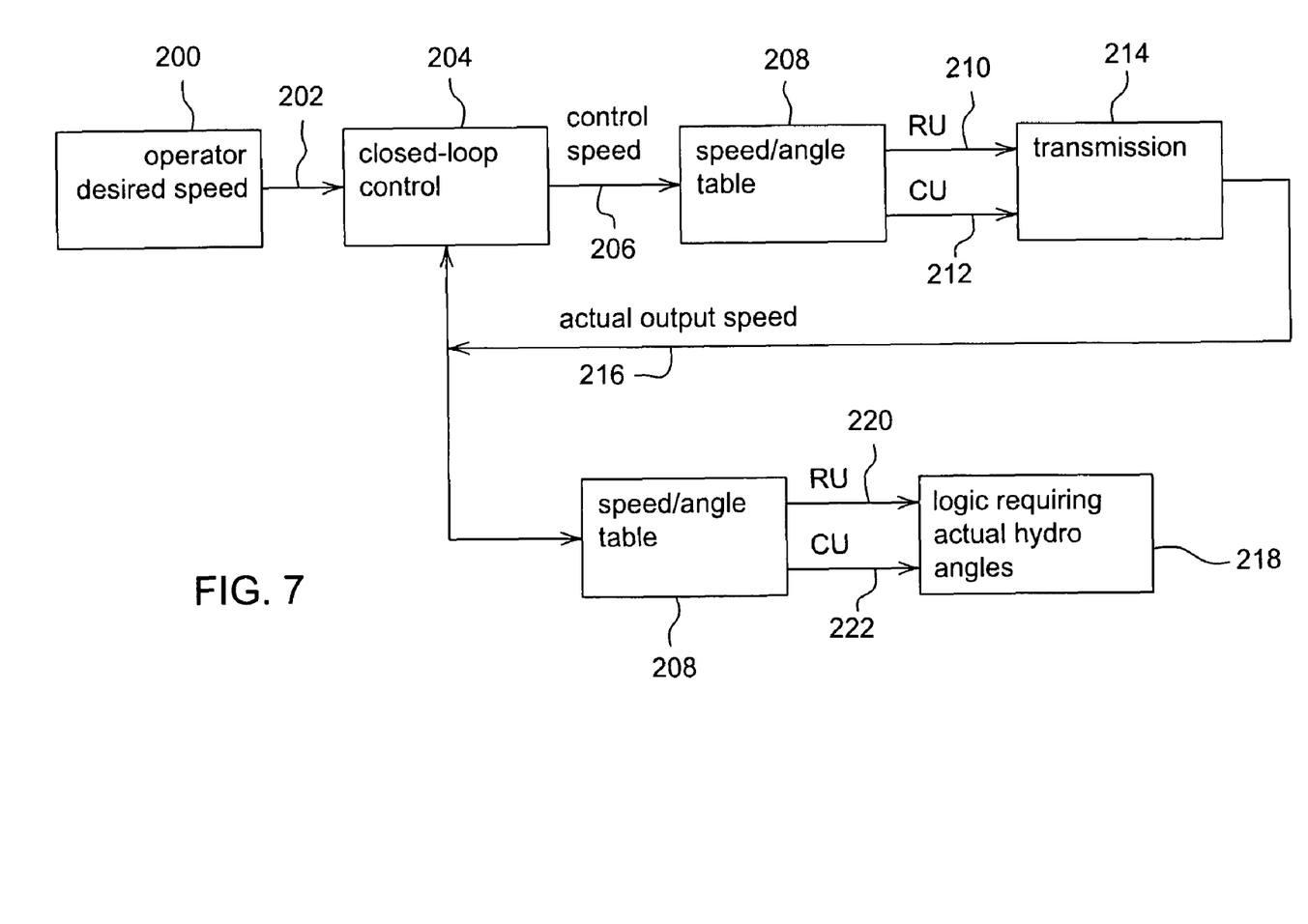

While driving, it is desirable to know the hydrostatic unit angle in order to position the hydrostatic unit during shifts, check for overspeed conditions dependent on hydrostatic unit angle, etc. When in gear, the hydrostatic units are controlled as illustrated in FIG. 7. At 200 a desired speed is input from a drive lever. 202 is the input to the 'in gear' closed-loop control system 204. The control system outputs a control speed 206 which is then converted to RU and CU angles via a predefined lookup table 208. This speed/angle table is populated based on the known characteristics of the transmission. The two hydrostatic unit angles are converted to RU 210 and CU 212 commands, which change the hydrostatic unit angles in the transmission 214 accordingly. However, the commanded hydrostatic unit angles may not match the actual angles due to hysteresis, etc. The control system will command more or less control speed until the desired speed matches the output speed. And in dynamic conditions, the output speed will not always match the desired speed. To overcome these difficulties, the hydrostatic unit angles can be derived at 218 by inputting the transmission output speed 216 into the same speed/angle lookup table 208.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for engaging a hydro-mechanical transmission (10) at startup, the hydro-mechanical transmission (10) having a hydrostatic transmission including: a first hydrostatic unit (CU); a second hydrostatic unit (RU) in fluid communication with the first hydrostatic unit (CU); a mechanical transmission (30) having a planetary gear system (32) including a first torque-coupling device (C1), a second torque-coupling device (C2), a third torque-coupling device (C3) and a fourth torque-coupling device (C4); a first element (S1) coupled to an input shaft (12) and driven thereby; a second element (R2) in driving engagement with the second hydrostatic unit (RU); a third element (28) selectively coupled to the first hydrostatic unit (CU) by the first torque-coupling device (C1), a fourth element (S2) selectively coupled to the first hydrostatic unit (CU) by the second torque-coupling device (C2), the fourth element (S2) drivingly coupled to the second element (R2); a fifth element (S3) coupled to an output shaft (46), the fifth element (S3) being selectively coupled to the fourth element (S2) by the fourth torque-coupling device (C4), and a sixth element (R3) selectively coupled to ground by a reverse brake (48) the method comprising the steps of:
   a.) engaging one or more of the torque-coupling devices (C3 and/or 48) to stop the third element (28) thereby forcing the first torque-coupling device (C1) speed to zero and causing a second element (R2) speed (and therefore RU speed) to increase;
   b.) when the second element (R2) speed is fast enough, triggering a second hydrostatic unit (RU) closed-loop control with a target of zero degrees (CU speed of zero);
   c.) when the first hydrostatic unit (CU) speed and first torque-coupling device (C1) speed are near zero engaging the first torque-coupling device (C1);
   d.) disengaging the one or more torque-coupling devices (C3 and/or 48) and stopping the closed-loop control;
   e.) ramping the second hydrostatic unit (RU) down until the first hydrostatic unit (CU) speed is below a negative threshold;
   f.) ramping the second hydrostatic unit (RU) up until the first hydrostatic unit (CU) reaches a sufficient positive speed; and
   g.) ramping the second hydrostatic unit (RU) back to zero so gear can be engaged.

2. A method for engaging a hydro-mechanical transmission (10) at startup as set forth in claim 1 further comprising after step e determining if an oil is warm or cold and if warm oil, ramping the second hydrostatic unit (RU) up until the first hydrostatic unit (CU) reaches a sufficient positive speed, or if cold oil, jumping immediately to a high current to a control valve controlling flow to the second hydrostatic unit (RU) until the first hydrostatic unit (CU) reaches a sufficient positive speed.

3. A method for engaging a hydro-mechanical transmission (10) at startup as set forth in claim 2 wherein the current to the control valve is a current value greater than a value known to give the sufficient positive speed.

* * * * *